(12) United States Patent
Ryu et al.

(10) Patent No.: US 9,158,475 B2
(45) Date of Patent: Oct. 13, 2015

(54) MEMORY APPARATUS AND METHOD THEREFOR

(75) Inventors: Seung-woo Ryu, Seoul (KR); Jae-min Ryu, Suwon-si (KR); Chul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1068 days.

(21) Appl. No.: 12/771,203

(22) Filed: Apr. 30, 2010

(65) Prior Publication Data

US 2010/0299513 A1 Nov. 25, 2010

(30) Foreign Application Priority Data

May 22, 2009 (KR) .................. 10-2009-0045118

(51) Int. Cl.
*G06F 12/02* (2006.01)
*G06F 3/06* (2006.01)
*G06F 11/14* (2006.01)
*G06F 13/16* (2006.01)

(52) U.S. Cl.
CPC .......... *G06F 3/0679* (2013.01); *G06F 11/1441* (2013.01); *G06F 13/1694* (2013.01)

(58) Field of Classification Search
CPC ............................ G06F 3/0679; G06F 11/1441
USPC ........................................................ 711/103
See application file for complete search history.

(56) References Cited

U.S. PATENT DOCUMENTS

| 5,778,443 A | 7/1998 | Swanberg et al. |
| 7,356,677 B1 | 4/2008 | Rafizadeh |
| 2002/0087816 A1 | 7/2002 | Atkinson et al. |
| 2005/0246565 A1 | 11/2005 | Koarai |
| 2006/0242398 A1 | 10/2006 | Fontijn et al. |
| 2007/0174669 A1* | 7/2007 | Ebata et al. ............ 714/6 |
| 2008/0005541 A1 | 1/2008 | Hase et al. |
| 2008/0189538 A1 | 8/2008 | King et al. |
| 2010/0064158 A1* | 3/2010 | Lai et al. .............. 713/323 |

FOREIGN PATENT DOCUMENTS

| EP | 0 566 306 | 10/1993 |
| EP | 1 406 174 | 4/2004 |
| JP | 5-299616 | 11/1993 |
| JP | 06-215589 | 8/1994 |
| JP | 2001-005723 | 1/2001 |

(Continued)

OTHER PUBLICATIONS

Intel: "Intel NAND Flash Memory Intel Turbo Memory,"May 31, 2007, pp. 1-8. URL: http://download.intel.com/design/flash/nand/turbomemory/whitepaper.pdf.

(Continued)

*Primary Examiner* — Charles Rones
*Assistant Examiner* — Ryan Dare
(74) *Attorney, Agent, or Firm* — NSIP Law

(57) ABSTRACT

A memory apparatus and an operation of the memory apparatus which allow quick booting are provided. The memory apparatus includes a volatile memory, a non-volatile memory, and a memory control unit to control input/output of data stored in the volatile memory and the non-volatile memory. The memory control unit restores data, according to a control command input from outside of the memory apparatus, from the non-volatile memory to the volatile memory in an on-demand fashion during booting.

38 Claims, 6 Drawing Sheets

(56) References Cited

FOREIGN PATENT DOCUMENTS

| | | |
|---|---|---|
| JP | 2005-010942 | 1/2005 |
| JP | 2005/0246565 | 11/2005 |
| JP | 2005-316855 | 11/2005 |
| JP | 2008-198210 | 8/2008 |
| KR | 10-2005-0028752 | 3/2005 |
| KR | 10-2006-0015329 | 2/2006 |
| KR | 10-2006-0031192 | 4/2006 |
| KR | 10-2006-0055436 | 5/2006 |
| KR | 10-2007-0095136 A | 9/2007 |
| KR | 10-2008-0057688 | 6/2008 |
| KR | 10-2008-0069088 | 7/2008 |
| WO | WO 03/090109 | 10/2003 |
| WO | WO 2004/049168 | 6/2004 |

OTHER PUBLICATIONS

European Search Report issued on Jul. 27, 2010, incorresponding European Application No. 10162916.0 (5 pages).

European Search Report issued on Aug. 9, 2010, in corresponding European Application No. 10163389.9 (6 pages).

Korean Office Action issued Feb. 23, 2015 in counterpart Korean Application No. KR 10-2009-0045118 (7 pages, in Korean, with English language translation).

* cited by examiner

MEMORY APPARATUS AND METHOD THEREFOR

CROSS REFERENCE TO RELATED APPLICATION(S)

This application claims the benefit under 35 U.S.C. §119 (a) of Korean Patent Application No. 10-2009-0045118, filed on May 22, 2009, the entire disclosure of which is incorporated herein by reference for all purposes.

BACKGROUND

1. Field

The following description relates to a memory apparatus and a method for the memory apparatus, and more particularly, to a memory apparatus enabling quick booting and a method for the memory apparatus.

2. Description of the Related Art

A computer system processor executes commands from a volatile memory such as a dynamic random access memory (DRAM). DRAM is capable of high speed access, but loses data stored therein when power is turned off since it is a volatile memory. Thus, data held in DRAM needs to be stored in a non-volatile memory such as hard disk and flash memory before the power supply to the DRAM is stopped.

For example, in a personal computer, default programs may be written in DRAM in order for the DRAM to exchange data with a keyboard or hard disk since no information is stored in the DRAM immediately after the power is supplied. This start-up process of the computer or initialization process of settings is referred to as "booting." Generally, the default programs are stored in storage mediums such as read-only memory (ROM) or hard disk drive (HDD). Data transmission from the above storage medium to DRAM occurs at low speed. Hence, a waiting time for a computer to boot when it is turned on is long and it takes a significant amount of time to initialize hardware.

SUMMARY

There are provided a memory apparatus and a method for the memory apparatus, which can reduce booting time of a computing device.

In one general aspect, there is provided a memory apparatus including a volatile memory, a non-volatile memory, and a memory control unit. The memory control unit restores data, according to an externally input signal, from the non-volatile memory to the volatile memory in an on-demand fashion during booting. The volatile memory may be a dynamic random access memory (DRAM), and the non-volatile memory may be at least one of NOR flash memory, NAND flash memory, and phase-change random access memory (PCRAM).

The memory control unit may determine whether data according to an address and a control signal which are included in the input signal is present in the volatile memory and, if the data is not present in the volatile memory, restore the data from the non-volatile memory to the volatile memory. A look-up table which includes information indicating whether data may be present at corresponding addresses of the volatile memory may be used in order to determine whether the data is present in the volatile memory. The look-up table may be a hardware component to expedite the determination process. The hardware component may be a flip-flop.

When it is determined that data corresponding to the address included in the input signal is present in the volatile memory and the control signal is a read signal, the memory control unit may transfer the externally input signal to the volatile memory such that the data is output from the volatile memory.

The memory control unit may control information stored in a single volatile memory to be stored in a plurality of corresponding non-volatile memories through multiple channels in a distributed manner in response to a zero power suspend-to-RAM (ZPSTR) mode command, wherein in ZPSTR mode, an operation of storing data stored in the volatile memory into the non-volatile memory may be performed. A mode command may be provided as a physical signal standardized in a predetermined form. The physical signal may be an electrical signal or a register command of the memory itself which instructs a specific register of command registers to output a command. Therefore, compatibility may be provided since the memory apparatus can be used without changing the existing hardware interface, and it may be possible to partially change and use a suspend-to-RAM (STR) mode which is used by existing operating systems (OS).

The memory control unit may store the data stored in the volatile memory into the non-volatile memory using a memory mapping table which shows a mapping relationship between a storage area of the volatile memory and a storage area of the non-volatile memory.

In addition, the memory control unit may control pieces of data related to the same application to be stored as closely together as possible in a particular storage area of the non-volatile memory in response to a storage request command from an operating system operated outside of the memory apparatus to request the data related to the same application from among the data of the volatile memory to be stored into the non-volatile memory.

Moreover, the memory control unit may store data related to a predetermined application in the non-volatile memory regardless of the input of a ZPSTR mode command in response to a request from outside of the memory apparatus to store the data related to the predetermined application from among data of the volatile memory into the non-volatile memory, wherein, in ZPSTR mode, an operation of storing data stored in the volatile memory into the non-volatile memory is performed.

Furthermore, the memory control unit may swap out some of the data stored in the volatile memory to the non-volatile memory in response to a swap command from an operating system operated outside of the memory apparatus.

Also, the memory control unit may include a decoder, a restoration determining unit, and a flow control unit. The decoder decodes an address and a control signal which are externally input. The restoration determining unit determines whether data requested according to the address and the control signal is present in the volatile memory. The flow control unit controls the input/output of data stored in the volatile memory and the non-volatile memory in accordance with the control signal. Additionally, the memory control unit may restore the data from the non-volatile memory to the volatile memory and then erase the restored data from the non-volatile memory.

In another general aspect, there is provided a method for a memory apparatus which includes a volatile memory, a non-volatile memory, and a memory control unit to control input/output of data stored in the volatile memory and the non-volatile memory, the method including restoring data, according to an externally input signal, from the non-volatile memory to the volatile memory in an on-demand fashion during booting.

Other features and aspects will be apparent from the following detailed description, the drawings, and the claims.

BRIEF DESCRIPTION OF THE DRAWINGS

Elements, features, and structures are denoted by the same reference numerals throughout the drawings and the detailed description, and the relative size and proportions of some elements may be exaggerated in the drawings for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will suggest themselves to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Descriptions of well-known functions and structures may be omitted for increased clarity and conciseness.

Figure 1:
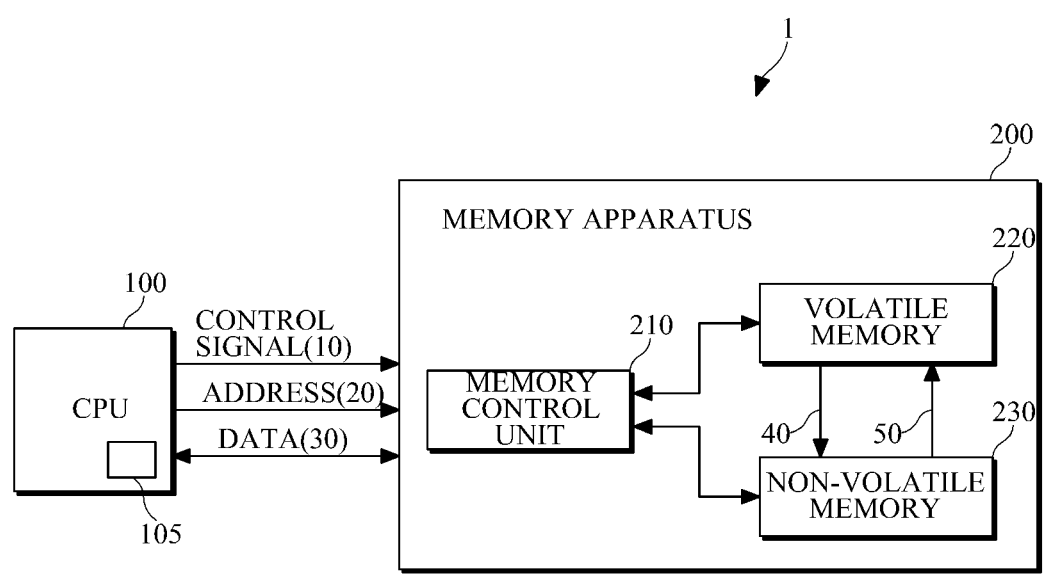
FIG. 1 is a diagram illustrating an example computing system including a memory apparatus.

FIG. 1 is a block diagram illustrating an example computing system 1 including a memory apparatus 200.

The computing system 1 includes a central processing unit (CPU) 100 and the memory apparatus 200. The CPU 100 may include at least one register 105. The computing system 1 executes a series of pre-written commands such as programs or program modules which may operate in a predetermined scheme. The program modules may include routines, programs, objects, components, and data configurations, which may perform particular tasks or implement particular abstract data types. The computing system 1 may be an electronic device in various forms, such as a personal computer, a laptop, and an embedded system, and there is no limitation in its type and form.

The CPU 100 may perform various operations and controls. In order to input and output data to/from the memory apparatus 200, the CPU 100 may transmit to the memory apparatus 200 a control signal 10, which includes a read/write command, and an address, which indicates a storage location of the data, and may transmit and receive data to/from the memory apparatus 200.

The memory apparatus 200 includes a memory control unit 210, a volatile memory 220, and a non-volatile memory 230. The memory control unit 210 may control data input/output between the CPU 100 and the volatile memory 220 and non-volatile memory 230. The memory control unit 210 may function as a buffer which is used to restore data from the non-volatile memory 230 to the volatile memory 220, and may include a random access memory (RAM; not shown) that stores data for operation of the memory control unit 210. Examples of RAM may include static random access memory (SRAM).

Although FIG. 1 illustrates that the memory apparatus 200 includes one volatile memory 220 and one non-volatile memory 230, a number of volatile memories 220 and non-volatile memories 230 may be provided to write and read data in parallel manner.

The volatile memory 220 may be used as a system memory to temporarily store data processing result of the computing system 1. The volatile memory 220 may be a dynamic random access memory (DRAM). Other types of volatile memory may also be employed as the volatile memory 220, for example, SDRAM, SRAM, etc. The list is nonlimiting. The non-volatile memory 230 may preserve data even when the power is turned off and may be used to back up data stored in the volatile memory 220. The non-volatile memory 230 may be a NOR flash memory, a NAND flash memory, or a phase-change memory (PCRAM). Other types of non-volatile memory may also be employed as the non-volatile memory 230. The list is nonlimiting.

An operating system may collect as much memory as possible without distributing memory areas corresponding to applications, and may write data in the non-volatile memory.

Although not illustrated in FIG. 1, the computing system 1 may be configured to include an external power switch, a power-supply, and an internal power switch that collectively control the power supply to each of the memory control unit 210, the volatile memory 220, and the non-volatile memory 230.

The computing system 1 may operate in normal mode, in suspend-to-RAM (STR) mode, and in zero-power-suspend-to-RAM (ZPSTR) mode. In addition, the computing system 1 may perform normal booting in which the system initialization is executed when the power is turned on, suspend-to-RAM mode releasing booting to switch from suspend-to-RAM to normal mode, and ZPSTR mode releasing booting to switch from ZPSTR to normal mode. The computing system 1 may use, for example, a plurality of booting programs stored in a predetermined area of the non-volatile memory 230 or an individual ROM to execute the normal booting, the suspend-to-RAM mode releasing booting, or the ZPSTR mode releasing booting according to a situation.

A mode command to instruct the computing system 1 to enter a particular mode or a command to release the computing system 1 from a particular mode, which is input from the CPU 100, may be provided as a physical signal standardized in a predetermined form. The physical signal may be an electrical signal or a register command of the memory itself which instructs a specific register of command registers to output a command. Therefore, compatibility may be provided since the memory apparatus 200 can be used without changing the existing hardware interface, and it may be possible to partially change and use a suspend-to-RAM mode which is used by existing operating systems (OS).

Operation of the normal booting of the computer system 1 will be described below.

When the power is turned on, a basic input output system (BIOS) booting program stored in the predetermined area of the non-volatile memory may be transferred to the volatile memory to allow the CPU to perform a booting operation. Furthermore, the memory control unit may perform operations for initializing the computing system 1 by controlling the volatile memory and the non-volatile memory, such that data is restored from the non-volatile memory to the volatile memory according to the order defined by BIOS under the control of the CPU.

Hereinafter, a suspend-to-RAM mode operation of the computing system 1 will be described.

In the suspend-to-RAM mode, power may be turned off to the CPU 100, but is supplied to the volatile memory 220. When receiving a suspend-to-RAM mode command as a control signal 10 from the CPU 100, the memory control unit 210 may store a CPU register value to the volatile memory 220. The CPU register value may be a value of an internal register, which may record a value used by the CPU, which may be an important value. For example, the CPU register value may include a program counter which indicates a location of a command currently executed on the memory.

In this case, when a suspend-to-RAM mode releasing command is input from the CPU 100, the memory control unit 210 may restore the CPU register value stored in the volatile memory 220 to the CPU 100, allowing the CPU 100 to execute a subsequent command.

Hereinafter, a ZPSTR mode operation of the computing system 1 will be described.

In the ZPSTR mode, power supply to the CPU 100 and to the non-volatile memory 220 may be disconnected. Accordingly, when a ZPSTR mode command is input from the CPU 100, the memory control unit 210 may copy the CPU register value and data stored in the volatile memory 220 to the non-volatile memory 230. For example, the CPU register value may be stored in a predetermined area of the non-volatile memory 230.

To quickly enter ZPSTR mode, data of a single volatile memory 220 may be stored in a plurality of non-volatile memories 230 through multiple channels in a parallel manner. If multiple volatile memories 220 are present and a corresponding number of non-volatile memories 230 are present, data of the volatile memories 220 may be, respectively, stored in the non-volatile memories 230 in a distributed manner.

To store data of the volatile memory 220 into a plurality of non-volatile memories 230 effectively, a memory mapping table may be further included, which represents a mapping relationship between storage areas of the respective non-volatile memories 230 and a corresponding storage area of the volatile memory 220. For example, the memory mapping table may indicate a one-to-one mapping relationship between the storage area of the volatile memory 220 and a part of the storage area of each non-volatile memory 230, except for an area where, for example, BIOS or flash translation layer (FTL) data is stored. The memory mapping table may be stored in a particular area in each non-volatile memory 230, and the memory control unit 210 may read the memory mapping table when the data of the volatile memory 220 is to be stored in the non-volatile memories 230. The memory mapping table may be included in the FTL.

In response to a ZPSTR releasing booting command from the CPU 100, the memory control unit 210 may restore the CPU register value stored in a specific area of the non-volatile memory 230 to the CPU 100, and may restore data of the non-volatile memory 230 to the volatile memory 220. In one example, not all the data previously copied from the non-volatile memory 230 to the volatile memory 220 is restored, but data according to a restored program counter included in the CPU register may only be restored from the non-volatile memory 230 to the volatile memory 220 in an on-demand fashion.

Figure 2:
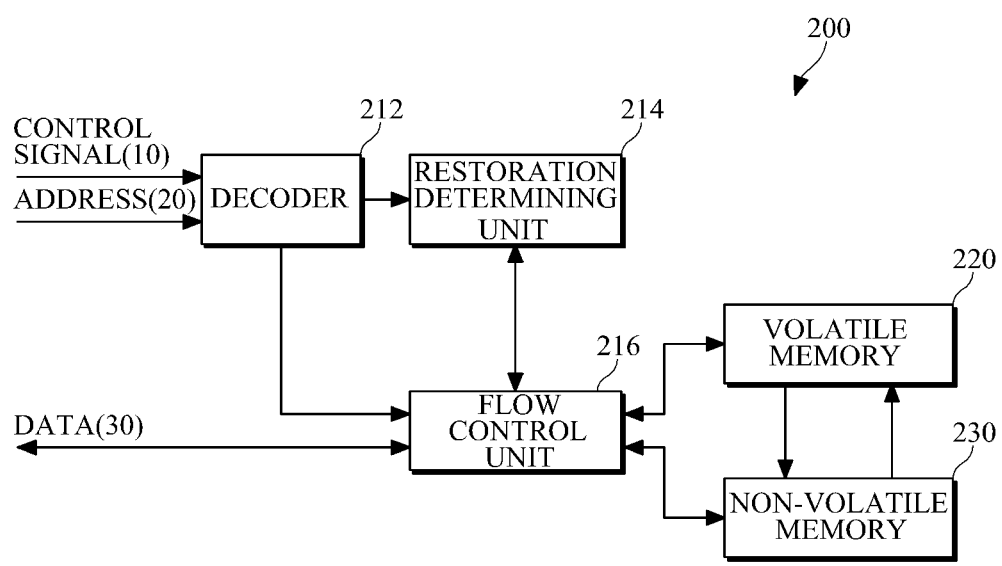
FIG. 2 is a diagram illustrating an example of the memory apparatus of FIG. 1.

During data restoration in an on-demand fashion, the memory control unit 210 may determine whether data which the CPU 100 requests to read is present in the volatile memory 220. To determine whether the requested data is present in the volatile memory 220, e.g., whether the requested data is available, the memory control unit 210 may be configured to include a restoration determining unit 214 which may be a hardware component as shown in FIG. 2.

In one implementation, since the memory control unit 210 as a hardware device may copy data from the volatile memory 220 to the non-volatile memory 230, restore the data from the non-volatile memory 230 to the volatile memory 220, and perform booting using hardware components in an on-demand fashion, the shift between ZPSTR mode and normal mode can be carried out more quickly than when performed under the control of software or an operating system.

It may be more efficient to sequentially read relevant data which has been written in an adjacent memory from the non-volatile memory 230 than to read data from distributed memory areas. In one implementation, when a command for requesting to store data which is related to the same application and stored in the volatile memory 220 to the non-volatile memory 230 is input from an operating system operated outside of the memory apparatus 200, for example, an operating system operated in the CPU 100, the memory control unit 210 may control the data related to the same application to be stored as closely together as possible in a specific area of the non-volatile memory 230.

In addition, in response to a request from an operating system operated outside of the memory apparatus 200 for storing data related to a given application from among data stored in the volatile memory 220 into the non-volatile memory 230, the memory control unit 230 may store the corresponding data related to the given application from the volatile memory 220 into the non-volatile memory 230 regardless of a ZPSTR mode command by which data stored in the volatile memory 220 is stored into the non-volatile memory 230. For example, when the ZPSTR mode command is input later on, the data previously stored into the non-volatile memory 230 may not need to be stored again. Therefore, data in the volatile memory 220, except for the previously stored data, may be stored into the non-volatile memory 230, and accordingly the storing time is reduced so that quick entering into the ZPSTR mode is possible.

To overcome physical capacity limitations of a system memory, a virtual memory scheme may be used to utilize a swap device or a swap partition, which may have a large capacity, as a part of a volatile memory. In one implementation, the memory control unit 210 may use the non-volatile memory 230 for a virtual memory scheme. For example, in response to a swap command from the operating system (OS), the memory control unit 210 may swap out some data which is not immediately used by the volatile memory 220 to the non-volatile memory 230, and swap data in the volatile memory 220 from the non-volatile memory 230 when the data swapped out to the non-volatile memory 230 is needed.

FIG. 2 is a block diagram illustrating an example of the memory apparatus of FIG. 1.

The memory apparatus 200 may include a decoder 212, the restoration determining unit 214, a flow control unit 216, the volatile memory 220 and the non-volatile memory 230. Configurations of the decoder 212, the restoration determining unit 214 and the flow control unit 216 correspond to the configuration of the memory control unit 210.

The decoder 212 may decode a control signal 10 and an address signal 20, which indicate commands input from the CPU 100.

The restoration determining unit 214 may determine whether data corresponding to an address input from the CPU 100 is present in the volatile memory 220. The restoration determining unit 214 may utilize a look-up table including information which indicates whether data corresponding to each address is present in the volatile memory 220.

The look-up table may be configured as a hardware component. As an example, the look-up table may be configured as a flip-flop. In this case, storage units of blocks of the non-volatile memory 230 may be mapped one to one to storage units of blocks of the volatile memory 220, and the flip-flop may be configured to indicate whether data of a corresponding unit block is present in the volatile memory 220 or the non-volatile memory 230. For example, the look-up table may include a plurality of blocks if the memory is divided into blocks, or may include a plurality of pages when each block is divided into units of pages. That is, there may be no limitation in the size of the corresponding memory areas of the volatile memory 220 and the non-volatile memory 230 for data storage. Also, software may be used in place of the flip-flop, as well as other hardware options to perform a corresponding function.

The flow control unit 216 may control the input/output of data stored in the volatile memory 220 and the non-volatile memory 230 in response to a control signal. The control signal may be generated automatically, or in response to a user input. For example, if the user selects or executes a STR or ZPSTR mode (e.g., in software), it can generate the control signal. In addition, if the user pushes the computer's power-off button, the computer can cause a hardware interrupt and then an operating system (OS) can generate the control signal. If the restoration determining unit 214 determines that data corresponding to an input address is not present in the volatile memory 220 and the control signal 10 is a read signal, the flow control unit 216 may generate a signal for copying data in a memory area (e.g., a page) corresponding to an address input from the non-volatile memory 230 to the volatile memory 220 and restore the data from the memory area to the volatile memory 220.

Moreover, the flow control unit 216 may erase the data restored from the non-volatile memory 230 to the volatile memory 220 after completing the data restoration. The erase operation may not need to be performed at each restoration operation, and it may be possible to be performed while a normal operation is carried out under the control of the CPU 100. If a read command is received during the erase operation, the flow control unit 216 may suspend the erase operation and execute the read command. Alternatively, the data may be erased all together from the non-volatile memory 220 upon entering ZPSTR mode, and data of the volatile memory 220 may be written in the non-volatile memory 230 at the next entry into ZPSTR mode.

If the restoration determining unit 214 determines that data corresponding to an input address is present in the volatile memory 220 and the control signal is a read signal, the flow control unit 216 may control a signal input from outside to be transmitted to the volatile memory 220.

If the control signal is a write signal, data 30 input from the CPU 100 may be transmitted to the volatile memory 220.

Additionally, the flow control unit 216 may perform data write and read operations sequentially when copying data from the volatile memory 220 to the non-volatile memory 230 and restoring the data from the non-volatile memory 230 to the volatile memory 220. In one example, since random reading occurs in the read operation, the flow control unit 216 may induce a sequential read operation. Particularly, the flow control unit 216 may perform data writing such that pieces of data related to a single application are not written in the non-volatile memory 230 in a distributed manner, reducing time to restore data to the volatile memory 220.

Figure 3:
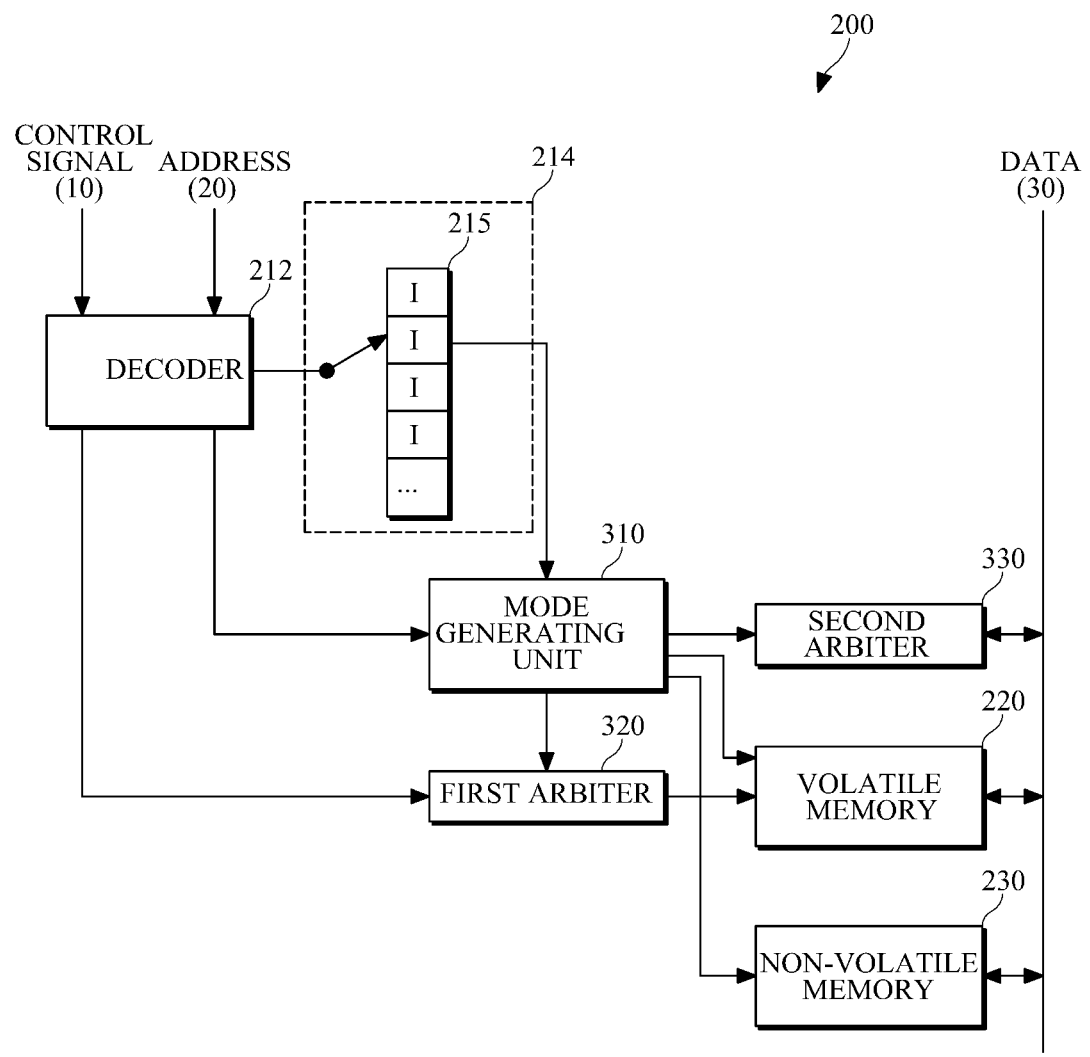
FIG. 3 is a diagram illustrating the memory apparatus of FIG. 2.

FIG. 3 illustrates an example of the memory apparatus of FIG. 2.

The memory apparatus 200 may include the decoder 212, the restoration determining unit 214, a mode generating unit 310, a first arbiter 320, a second arbiter 330, the volatile memory 220, and the non-volatile memory 230. The elements denoted by the same reference numeral as the elements in FIG. 2 have the same configuration and perform the same operation, and thus the detailed description thereof will not be reiterated. The mode generating unit 310, the first arbiter 320, and the second arbiter 330 correspond to the configuration of the flow control unit 216 of FIG. 2.

The restoration determining unit 214 may determine, using a look-up table 215, whether requested data is present in the volatile memory 220. The look-up table 215 may be configured to include an "I" bit in each address for indicating the availability of data in the volatile memory 220. For example, if an "I" bit of an address is 0, it may indicate that data corresponding to the address is available in the volatile memory 220; and if an "I" bit of the address is 1, it may indicate that data corresponding to the address is not available in the volatile memory 220. Therefore, since there is no available data in the volatile memory immediately after ZPSTR releasing booting is performed, all "I" bits in the look-up table 215 may be set to 1 as default.

The mode generating unit 310 may receive "I" bit information of an address from the restoration determining unit 214, and control the output/input of data stored in the volatile memory 220 and the non-volatile memory 230 according to a result of decoding a control signal 10 by the decoder 212. The mode generating unit 310 may generate a signal for copying a page from the non-volatile memory 230 to the volatile memory 220 when an "I" bit of the look-up table is 1 (e.g., invalid) and the control signal 10 is a read signal. When the data is restored to the volatile memory 220, the restored data may be transmitted to the CPU 100. The mode generating unit 310 may update the "I" bit of an address corresponding to the data restored to the volatile memory 220 from 1 to 0.

Moreover, if the "I" bit of the look-up table is 0 (e.g., valid) and the control signal 10 is a read signal, the mode generating unit 310 may transmit the input control signal 10 to the volatile memory 220 such that the data corresponding to an address can be output from the volatile memory 220 to the CPU 100 outside of the memory apparatus 200.

The first arbiter 320 and the second arbiter 330 may control a signal related to a data bus to prevent various signals from being mixed together in the data bus.

Figure 4:
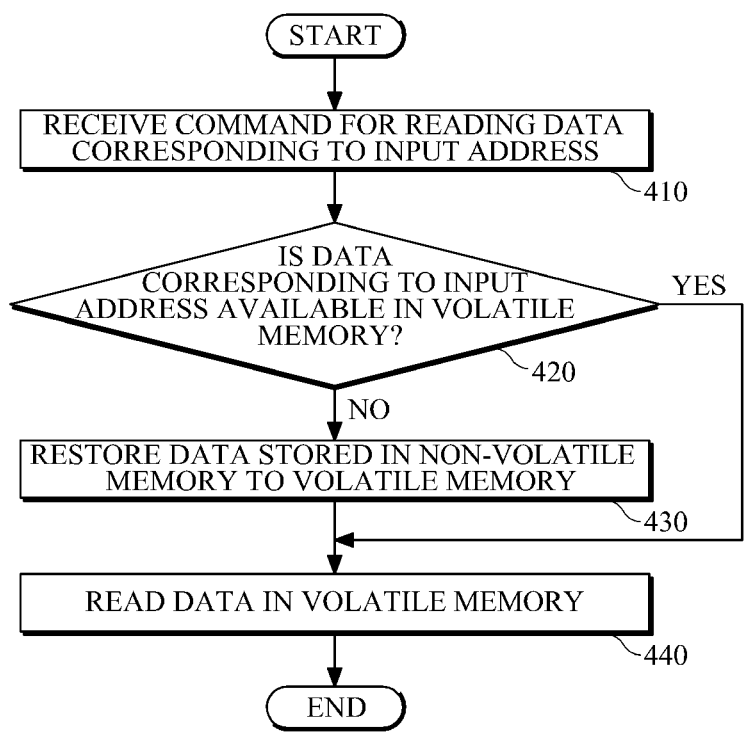
FIG. 4 is a flowchart illustrating an example of a method for a memory apparatus.

FIG. 4 is a flowchart depicting an example of a method for a memory apparatus. Data restoration from a non-volatile memory to a volatile memory in an on-demand fashion at ZPSTR releasing booting operation will be described below with reference to FIGS. 1 and 4.

The memory control unit 210, at operation 410, may receive a command for reading data corresponding to an input address, and then it may be determined, at operation 420, whether data corresponding to the input address is present in the volatile memory 220.

If it is determined, at operation 420, that the data corresponding to the input address is not present in the volatile memory 220, the memory control unit 210, at operation 430, may restore data stored in the non-volatile memory 230 to the volatile memory 220, and, at operation 440, may read data from the volatile memory 220 and transmit the read data to the CPU 100.

If it is determined, at operation 420, that the data corresponding to the input address is present in the volatile memory 220, the memory control unit 210 may read data from the volatile memory 220 and transmit the read data to the CPU 100.

Figure 5:
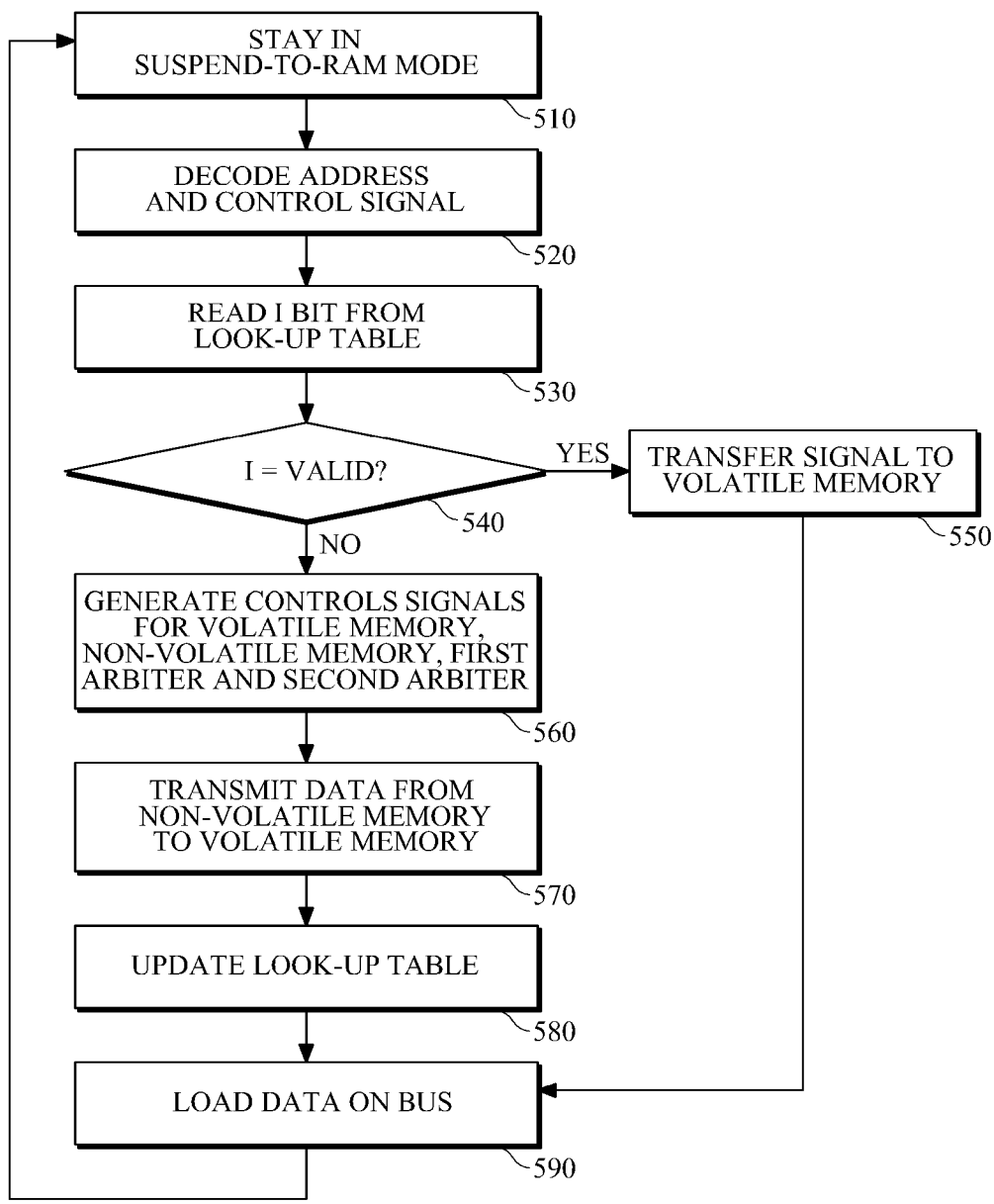
FIG. 5 is a flowchart illustrating another example of a method for a memory apparatus.

FIG. 5 is a flowchart illustrating another example of a method for a memory apparatus.

Referring to FIGS. 3 and 5, when the memory apparatus 200 stays in suspend-to-RAM mode after ZPSTR releasing booting operation at operation 510, the decoder 212, at operation 520, may decode an address and a control signal which are input from the CPU 100. The restoration determining unit 214, at operation 530, may read an "I" bit from the look-up table 215, which may correspond to the address, and, at operation 540, may determine whether the "I" bit indicates validity which represents that data corresponding to the address is present in the volatile memory 220.

If it is determined, at operation 540, that the data corresponding to the address is not present in the volatile memory 220, the mode generating unit 310, at operation 560, may generate control signals for the volatile memory 220, the non-volatile memory 230, the first arbiter 320, and the second arbiter 330.

Data may be transmitted from the non-volatile memory 230 to the volatile memory 220 under the control of the mode generating unit 310 at operation 570. Once the data is transmitted to the volatile memory 220, the volatile memory 220 may have the data corresponding to the input address, and thus the mode generating unit 310 may update the "I" bit corresponding to the input address in the look-up table 215 from 1 (e.g., invalid) to 0 (e.g., valid) at operation 580. The data restored to the volatile memory 220 may be loaded onto the data bus and transmitted to the CPU 100.

If the "I" bit indicates that the data corresponding to the input address is present in the volatile memory 220, the mode generating unit 310 may transfer the control signal to the volatile memory 220 at operation 550, and data according to the control signal may be loaded from the volatile memory 220 to the data bus and transmitted to the CPU 100 at operation 590.

Figure 6:
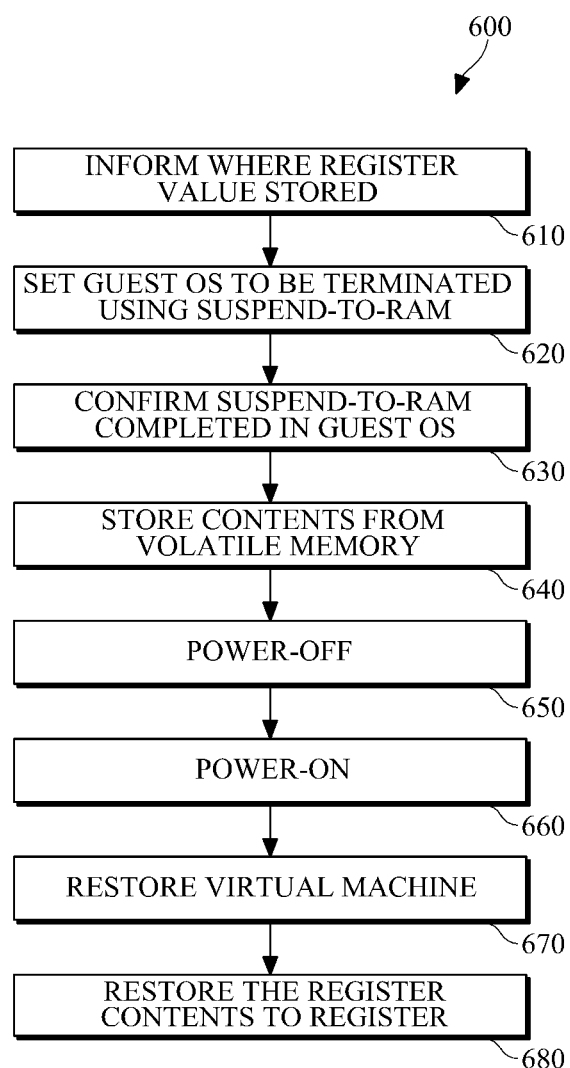
FIG. 6 is a flowchart illustrating another example of a method according to an embodiment.

Embodiments also may provide improved switching between a virtual machine, e.g., Xen, and a guest operating system (OS), e.g., Linux, Windows, MacOS, etc. A native OS, (e.g., Linux, Windows, MacOS, etc.) may be used in place of the virtual machine. Also, software simulation may be available. FIG. 6 is a flowchart illustrating another example of a method 600 according to an embodiment. When setting up the guest OS, it may be done such that the virtual machine is informed of the area of a general storage or the volatile memory 220 in which the contents of the register 105 in the CPU 100 is stored (operation 610). The guest OS may be set to be terminated using suspend-to-RAM (operation 620).

The virtual machine may confirm that suspend-to-RAM is completed in the guest OS (operation 630), and may store all contents of a general volatile memory module which is currently used or the volatile memory 220 area in the memory apparatus 200 (operation 640). For reference, volatile memory 220 areas of the guest OS and the virtual machine may be partitioned. Data may be stored in a general storage unit using suspend-to-disk function of the virtual machine. Power-off operation which completely turns off power may be performed (operation 650). In response to power-on (operation 660), hibernation of the virtual machine may be restored (operation 670).

When restoration of the virtual machine is completed, the contents of the register 105 is restored from general volatile memory module or the memory apparatus 200 corresponding to the guest OS volatile memory 220 area (operation 680) or general storage area. When an instruction is executed in the CPU 100, memory address access may be requested. At this time, the access may pass through a pseudo physical memory layer of the virtual machine using "page fault," and it can be known which memory area is requested. Restored and non-restored areas may be managed by the virtual machine with a table or a bitmap. When memory access to the non-restored area occurs, the memory apparatus 200 or virtual machine may read the area on a block-by-block basis, and can restore the area immediately.

A memory apparatus includes a volatile memory, a non-volatile memory, and a memory controller configured to restore data, according to an externally input signal, from the non-volatile memory to the volatile memory in an on-demand fashion during booting. The memory control unit may store data from the volatile memory to the non-volatile memory before power is disconnected from the volatile memory. In addition, the memory control unit may transfer data back into the volatile memory from the non-volatile memory. A lookup table may be used to correlate the addresses in the volatile memory to the data stored in the non-volatile memory.

The processes, functions, methods, operations, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices is configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

The memory module, which may include Flash/DRAM memory devices and/or memory controllers, may be included in various types of packages. For example, the flash/DRAM memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The memory module, which may include the flash/DRAM memory devices and/or the memory controllers, may include memory cards. In this case, the memory controllers may be constructed to communicate with an external device for example, a host using any one of various types of interface protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory devices may be non-volatile memory devices that can maintain stored data even when power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a DVD, a router, and a Global Positioning System (GPS).

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A memory apparatus, comprising:
a volatile memory;
a non-volatile memory; and
a memory control unit configured to
restore data, based on an externally input signal, from the non-volatile memory to the volatile memory in an on-demand fashion during booting, and
store information of the volatile memory into corresponding non-volatile memories of the non-volatile memory through channels in a distributed manner in response to a zero power suspend-to-RAM (ZPSTR) mode command.

2. The memory apparatus of claim 1, wherein the volatile memory comprises a dynamic random access memory (DRAM).

3. The memory apparatus of claim 1, wherein the non-volatile memory comprises a NOR flash memory, or a NAND flash memory, or a phase-change random access memory (PCRAM), or any combination thereof.

4. The memory apparatus of claim 1, wherein the memory control unit is further configured to:
determine whether the data, based on an address and a control signal that are included in the input signal, is present in the volatile memory; and
if the data is not present in the volatile memory, restore the data from the non-volatile memory to the volatile memory.

5. The memory apparatus of claim 4, wherein the memory control unit is further configured to:
determine whether the data is present in the volatile memory based on a look-up table comprising information indicating whether the data is present at corresponding addresses of the volatile memory.

6. The memory apparatus of claim 5, wherein the look-up table comprises a hardware component.

7. The memory apparatus of claim 6, wherein the hardware component comprises a flip-flop.

8. The memory apparatus of claim 4, wherein the memory control unit is further configured to:
when the data corresponding to the address included in the input signal is determined to be present in the volatile memory and the control signal comprises a read signal, transfer the externally input signal to the volatile memory such that the data is output from the volatile memory.

9. The memory apparatus of claim 1, wherein the memory control unit is further configured to:
store the information of the volatile memory into the corresponding non-volatile memories using a memory mapping table configured to show a mapping relationship between a storage area of the volatile memory and storage areas of the non-volatile memory.

10. The memory apparatus of claim 1, wherein the memory control unit is further configured to:
store pieces of data related to an application, from among the data of the volatile memory, as closely together as possible in a storage area of the non-volatile memory in response to a storage request command from an operating system operated outside of the memory apparatus that requests the data related to the application, from among the data of the volatile memory, to be stored into the non-volatile memory.

11. The memory apparatus of claim 1, wherein the memory control unit is further configured to:
store data related to a predetermined application, from among the data of the volatile memory, into the non-volatile memory regardless of the ZPSTR mode command in response to a request from an operating system operated outside of the memory apparatus to store the data related to the predetermined application, from among the data of the volatile memory, into the non-volatile memory.

12. The memory apparatus of claim 1, wherein the memory control unit is further configured to:
swap out some of the data of the volatile memory to the non-volatile memory in response to a swap command from an operating system operated outside of the memory apparatus.

13. The memory apparatus of claim 1, wherein the memory control unit comprises:
a decoder configured to decode an address and a control signal that are included in the externally input signal;
a restoration determining unit configured to determine whether the data, based on the address and the control signal, is present in the volatile memory; and
a flow control unit configured to control input and output of the data stored in the volatile memory and the non-volatile memory based on the control signal.

14. The memory apparatus of claim 1, wherein the memory control unit is further configured to:
erase the restored data from the non-volatile memory after the data is restored from the non-volatile memory to the volatile memory.

15. A method of operating a memory apparatus comprising a volatile memory, a non-volatile memory, and a memory control unit to control input and output of data stored in the volatile memory and the non-volatile memory, the method comprising:
restoring the data, based on an externally input signal, from the non-volatile memory to the volatile memory in an on-demand fashion during booting; and
storing information of the volatile memory into corresponding non-volatile memories of the non-volatile memory through multiple channels in a distributed manner in response to a zero power suspend-to-RAM (ZPSTR) mode command.

16. The method of claim 15, wherein the volatile memory comprises a dynamic random access memory (DRAM).

17. The method of claim 15, wherein the non-volatile memory comprises NOR a flash memory, or a NAND flash memory, or a phase-change random access memory (PCRAM), or any combination thereof.

18. The method of claim 15, wherein the restoring of the data comprises:
  determining whether the data, based on an address and a control signal that are included in the input signal, is present in the volatile memory; and
  if the data is not present in the volatile memory, restoring the data from the non-volatile memory to the volatile memory.

19. The method of claim 18, wherein the determining of whether the data is present in the volatile memory comprises:
  determining whether the data is present in the volatile memory based on a look-up table comprising information indicating whether the data is present at corresponding addresses of the volatile memory.

20. The method of claim 18, further comprising:
  when the data corresponding to the address included in the input signal is determined to be present in the volatile memory and the control signal is a read signal, transferring the externally input signal to the volatile memory such that the data is output from the volatile memory.

21. A method of switching between a virtual machine and a guest operating system (OS) in a computer, the computer configured to support a suspend-to-RAM function, the method comprising:
  informing the virtual machine of an area in a volatile memory in which contents of a register of a central processing unit (CPU) are stored;
  setting the guest OS to be terminated using the suspend-to-RAM function;
  confirming, by the virtual machine, that the suspend-to-RAM function is completed in the guest OS;
  storing, by the virtual machine, contents of the area in the volatile memory;
  performing a power-off operation;
  performing a power-on function;
  restoring the virtual machine; and
  restoring the contents of the register to the register from the area in the volatile memory.

22. The method of claim 21, further comprising:
  partitioning the area in volatile memory into areas respectively corresponding to the guest OS and the virtual machine.

23. The method of claim 21, further comprising:
  storing data in a general storage unit using a suspend-to-disk function of the virtual machine.

24. The method of claim 21, further comprising:
  executing, by the computer, an instruction; and
  requesting memory address access in response to the executing.

25. The method of claim 24, further comprising:
  passing the memory address access through a pseudo physical memory layer of the virtual machine using a page fault.

26. The method of claim 21, further comprising:
  managing, by the virtual machine, restored and non-restored areas of the volatile memory with a table.

27. The method of claim 21, further comprising:
  in response to a memory access to a non-restored area of the volatile memory occurring, reading the non-restored area on a block-by-block basis.

28. The method of claim 27, further comprising:
  restoring the non-restored area.

29. The method of claim 21, further comprising:
  managing, by the virtual machine, restored and non-restored areas of the volatile memory with a bitmap.

30. A computer supporting a suspend-to-RAM function, the computer comprising:
  a central processing unit (CPU) comprising a register, the register comprising contents;
  a volatile memory comprising an area;
  a non-volatile memory;
  a virtual machine;
  a guest operating system (OS) configured to be terminated using the suspend-to-RAM function; and
  a memory controller configured to
    switch between the virtual machine and the guest OS, and
    inform the virtual machine of the area in the volatile memory in which the contents of the register are stored,
  wherein the virtual machine is configured to
    confirm that the suspend-to-RAM function is completed in the guest OS, and
    store contents of the area in the volatile memory,
  wherein the computer is configured to
    perform a power-off operation, and
    performing a power-on function, and
  wherein the memory controller is further configured to
    restore the virtual machine, and
    restore the contents of the register to the register from the area in the volatile memory.

31. The computer of claim 30, wherein the memory controller is further configured to:
  partition the area in volatile memory into areas respectively corresponding to the guest OS and the virtual machine.

32. The computer of claim 30, further comprising:
  a general storage unit configured to store data using a suspend-to-disk function of the virtual machine.

33. The computer of claim 30, wherein the computer is further configured to:
  execute an instruction; and
  request memory address access in response to the execution.

34. The computer of claim 33, wherein the virtual machine is further configured to:
  pass the memory address access through a pseudo physical memory layer of the virtual machine using a page fault.

35. The computer of claim 30, wherein the virtual machine is further configured to:
  manage restored and non-restored areas of the volatile memory with a table.

36. The computer of claim 30, wherein the virtual machine is further configured to:
  manage restored and non-restored areas of the volatile memory with a bitmap.

37. The computer of claim 30, wherein the memory controller is further configured to:
  in response to a memory access to a non-restored area occurring, read the non-restored area on a block-by-block basis.

38. The method of claim 37, wherein the memory controller is further configured to:
  restore the non-restored area.

* * * * *